(12) United States Patent
Smith et al.

(10) Patent No.: US 9,686,101 B2
(45) Date of Patent: Jun. 20, 2017

(54) STREAM CREATION WITH LIMITED TOPOLOGY INFORMATION

(71) Applicant: Lattice Semiconductor Corporation, Portland, OR (US)

(72) Inventors: Taliaferro Smith, San Jose, CA (US); Sergey Yarygin, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 119 days.

(21) Appl. No.: 14/597,186

(22) Filed: Jan. 14, 2015

(65) Prior Publication Data

US 2015/0326439 A1   Nov. 12, 2015

Related U.S. Application Data

(60) Provisional application No. 61/991,126, filed on May 9, 2014.

(51) Int. Cl.
| | |
|---|---|
| *H04L 12/66* | (2006.01) |
| *H04L 12/28* | (2006.01) |
| *H04B 7/216* | (2006.01) |
| *H04L 12/64* | (2006.01) |
| *H04L 12/24* | (2006.01) |
| *H04L 12/751* | (2013.01) |
| *H04L 12/741* | (2013.01) |

(52) U.S. Cl.
CPC ...... *H04L 12/6418* (2013.01); *H04L 41/0853* (2013.01); *H04L 41/0883* (2013.01); *H04L 41/12* (2013.01); *H04L 45/02* (2013.01); *H04L 45/745* (2013.01)

(58) Field of Classification Search
CPC ..... H04L 47/10; H04L 12/5693; H04L 49/35; H04L 49/254
See application file for complete search history.

(56) References Cited

U.S. PATENT DOCUMENTS

| | | | |
|---|---|---|---|
| 6,487,170 B1 * | 11/2002 | Chen ................. | H04L 12/1827 370/231 |
| 6,614,764 B1 | 9/2003 | Rodeheffer et al. | |

(Continued)

FOREIGN PATENT DOCUMENTS

JP            2002-281060 A       9/2002

OTHER PUBLICATIONS

PCT International Search Report and Written Opinion, PCT Application No. PCT/US2015/023711, Jun. 29, 2015, 17 pages.

*Primary Examiner* — Melanie Jagannathan
(74) *Attorney, Agent, or Firm* — Fenwick & West LLP

(57) ABSTRACT

The discovery of a topology of a network with an unknown topology can enable the selection of a data path within the network, and the establishment of a data stream over the selected data path. Routing tables mapping originating nodes to input ports can be created based on the receipt of discovery messages generated by the originating nodes. A source node can select a data path between the source node and a sink node in order to establish a data stream using the routing tables. Data paths can be selected based on, for instance, routing table bandwidth information, latency information, and/or distance information. Data streams can be established over the selected data path, and each node can release any reserved output bandwidth determined to be unnecessary for the data stream.

21 Claims, 10 Drawing Sheets

(56) References Cited

U.S. PATENT DOCUMENTS

| | | | |
|---|---|---|---|
| 7,046,691 B1 | 5/2006 | Kadyk et al. | |
| 7,660,255 B2* | 2/2010 | Berthaud | H04L 45/00 370/238 |
| 8,358,651 B1* | 1/2013 | Kadosh | H04L 49/3063 370/360 |
| 8,391,289 B1* | 3/2013 | Yalagandula | H04L 12/2818 370/392 |
| 8,451,846 B1* | 5/2013 | Ayyangar | H04L 45/50 370/395.5 |
| 2002/0126671 A1* | 9/2002 | Ellis | H04L 12/18 370/390 |
| 2002/0176359 A1* | 11/2002 | Durinovic-Johri | H04L 12/24 370/229 |
| 2004/0006613 A1* | 1/2004 | Lemieux | H04L 47/724 709/223 |
| 2004/0062266 A1* | 4/2004 | Rojas | H04L 12/5693 370/447 |
| 2004/0073715 A1* | 4/2004 | Folkes | H04L 45/00 709/250 |
| 2004/0170124 A1* | 9/2004 | De Clercq | H04L 12/5695 370/229 |
| 2004/0247317 A1 | 12/2004 | Sadananda | |
| 2005/0018670 A1* | 1/2005 | Shigematsu | H04L 45/00 370/389 |
| 2005/0036452 A1* | 2/2005 | Banerjee | H04L 1/0061 370/252 |
| 2005/0100010 A1* | 5/2005 | Jain | H04L 45/00 370/389 |
| 2006/0056424 A1* | 3/2006 | Lih | H04L 49/358 370/401 |
| 2006/0153193 A1* | 7/2006 | Kim | H04L 45/00 370/392 |
| 2006/0268735 A1* | 11/2006 | McAllister | H04L 12/5695 370/252 |
| 2007/0047540 A1* | 3/2007 | Bragg | H04L 45/54 370/386 |
| 2007/0127367 A1* | 6/2007 | Ogasahara | H04W 40/22 370/226 |
| 2007/0153764 A1 | 7/2007 | Thubert et al. | |
| 2007/0195715 A1* | 8/2007 | Yamano | H04W 40/04 370/254 |
| 2007/0211667 A1* | 9/2007 | Agrawal | H04W 72/14 370/335 |
| 2007/0214412 A1 | 9/2007 | Arquie | |
| 2007/0286217 A1* | 12/2007 | Miyata | H04L 12/5692 370/401 |
| 2008/0013534 A1* | 1/2008 | Tsuzuki | H04L 45/00 370/389 |
| 2009/0073924 A1 | 3/2009 | Chou | |
| 2009/0113066 A1* | 4/2009 | Van Wie | H04L 12/1827 709/231 |
| 2009/0116404 A1 | 5/2009 | Mahop et al. | |
| 2010/0208621 A1 | 8/2010 | Morper | |
| 2011/0299396 A1 | 12/2011 | Yan et al. | |
| 2011/0310734 A1 | 12/2011 | Mizukoshi | |
| 2012/0170590 A1 | 7/2012 | Chung et al. | |
| 2012/0281551 A1* | 11/2012 | Alanara | H04L 27/2607 370/252 |
| 2013/0258935 A1* | 10/2013 | Zhang | H04W 72/005 370/312 |
| 2013/0272262 A1* | 10/2013 | Li | H04W 28/02 370/330 |
| 2013/0315152 A1* | 11/2013 | Ratasuk | H04W 76/023 370/329 |
| 2013/0336302 A1* | 12/2013 | Lee | H04L 5/001 370/336 |
| 2014/0241345 A1* | 8/2014 | Decusatis | H04L 49/25 370/355 |

* cited by examiner

| Node G Routing Table 400 | | | | |
|---|---|---|---|---|
| Originating Node | Port | Distance (hops) | Latency | Bandwidth |
| A | 1 | 3 | 22ms | 5.8mb/s |
| A | 2 | 4 | 29ms | 4.1mb/s |
| B | 1 | 2 | 13ms | 6.1mb/s |
| B | 2 | 3 | 20ms | 4.1mb/s |
| C | 1 | 3 | 19ms | 4.9mb/s |
| C | 2 | 3 | 26ms | 4.1mb/s |
| D | 1 | 3 | 20ms | 4.1mb/s |
| D | 2 | 2 | 13ms | 4.1mb/s |
| E | 1 | 4 | 27ms | 4.1mb/s |
| E | 2 | 1 | 6ms | 7.2mb/s |
| F | 1 | 1 | 8ms | 6.1mb/s |
| F | 2 | 4 | 25ms | 4.1mb/s |

Figure 4

| Node B Forwarding Table 700 ||||| 
|---|---|---|---|---|
| Global ID | Local ID | Input port | Output port | Output Bandwidth |
| A | X | 1 | 3 | 4.4mb/s |
| B | Y | 1 | 4 | 2.1mb/s |
| C | Z | 2 | 3 | 3.9mb/s |

Figure 7

STREAM CREATION WITH LIMITED TOPOLOGY INFORMATION

RELATED APPLICATIONS

This application claims priority to, and the benefit of, U.S. Provisional Application No. 61/991,126, filed on May 9, 2014, the contents of which are hereby incorporated in their entirety.

FIELD

Embodiments of the invention generally relate to the field of networks and, more particularly, to the establishment of a data stream within a network of an unknown topology.

BACKGROUND

The transmission of data (such as media data) from a source device to a sink device requires the establishment of a data stream between the source device and the sink device, and possibly through one or more intermediary devices. In a network with known, established, or static topologies, the characteristics of each node within the network can be analyzed, and the data path through which the data stream is established can be selected based on this analysis. However, in networks with an unknown or variable topology, the composition of the network (such as the number of nodes, the characteristics of each node, the interconnections between the nodes, and the like) is unknown to any single node or is subject to change, limiting the ability to identify the optimal data path from a source device to a sink device. In addition, different types of data streams are associated with different priorities. For example, for data streams associated with video games, stream latency is prioritized over stream bandwidth, while for high definition video, stream bandwidth is prioritized over stream latency. Accordingly, selecting an optimal data path and establishing a corresponding data stream in a network with unknown topology requires the discovery of the network composition and an analysis of the networking composition and characteristics of network nodes in view of data stream priorities.

SUMMARY

As described herein, the discovery of a topology of a network with an unknown topology can enable the selection of a data path within the network, and the establishment of a data stream over the selected data path. To discover a network's topology, one or more nodes ("originating nodes") within the network can transmit discovery messages on each node output port coupled to another node identifying the originating node. Nodes within the network, upon receiving the discovery messages, and re-transmit the discovery messages to other nodes. The process is repeated until each message has traveled each or most data paths within the network. Upon receiving a discovery message, a receiving node can add or update an entry within a routing table corresponding to the originating node and the port through which the discovery message was received. The routing table entry can further include bandwidth information describing a minimum bandwidth between the originating node and the receiving node, latency information describing a total latency between the originating node and the receiving node, and distance information describing a distance between the originating node and the receiving node.

A source node can select a data path between the source node and a sink node in order to establish a data stream. The source node can query a routing table of the source node with the identity of the sink node to identify an output port of the source node corresponding to a data path associated with the sink node. The intermediary node communicatively coupled to the source node via the output port in turn queries a routing table of the intermediary node to identify an output port of the intermediary node corresponding to a data path associated with the sink node. The process continues until a data path between the source node and the sink node is selected. Output ports can be selected based on any suitable criteria, for instance routing table bandwidth information, routing table latency information, routing table distance information, and the like. In addition, bandwidth estimated to be necessary to establish the data stream can be reserved by each node within the data path.

In response to a request to establish a data stream via a selected data path, a sink node can provide a list of formats compatible with the sink node to the intermediary node upstream from the sink node within the data path. The intermediary node can remove formats that are not compatible with the intermediary node, and can add formats that the intermediary node can transcode into one or more formats within the list of formats. The process continues for each intermediary node in the data path until the source node receives the updated list of formats. The source node subsequently selects a format from the updated list of formats, and provides an indication of the selected format to the data path node downstream from the source node. The downstream node either provides the indication of the selected format to the next downstream node in the data path, or provides an indication of a format that the downstream node can transcode the selected format into. The process continues until the sink node is reached. The source node can subsequently output data in the selected format, and each node in the data path can either forward the data to the next node in the data path, or can transcode the data into a different format, and forward the transcoded data to the next node in the data path. Each node can release any unnecessary reserved bandwidth in response to the selection of an output format, thus allowing the released bandwidth to be allocated to different data streams.

BRIEF DESCRIPTION OF THE DRAWINGS

Embodiments of the invention are illustrated by way of example, and not by way of limitation, in the figures of the accompanying drawings in which like reference numerals refer to similar elements:

FIG. 4 illustrates a routing table for use by a topology discovery process, according to one embodiment.

FIG. 7 illustrates a forwarding table for use by a node in establishing a data stream within a network, according to one embodiment.

DETAILED DESCRIPTION

Figure 1:
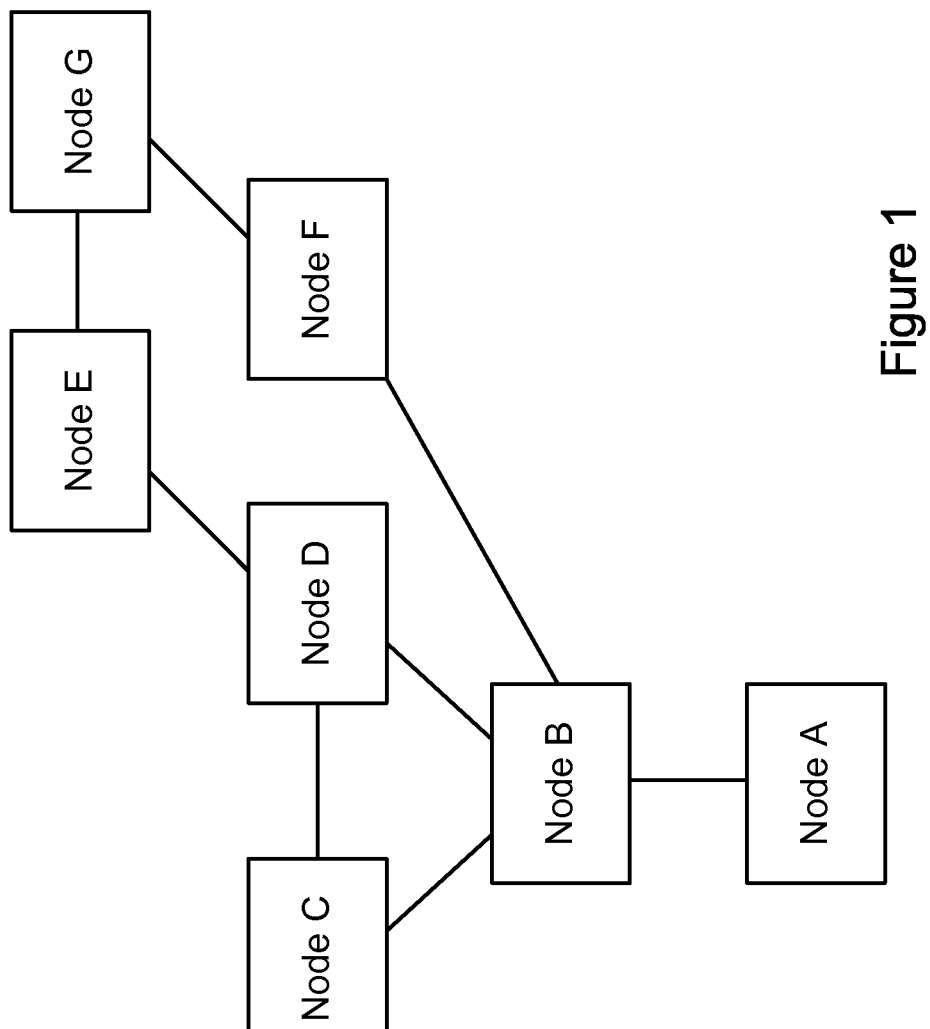
FIG. 1 is a block diagram illustrating a network topology, according to one embodiment.

As used herein, "network" or "communication network" mean a set of interconnected nodes. As used herein, "node" refers to a computing device configured to transmit or receive data from one or more other nodes within the network. Examples of nodes include computers (such as specially configured desktop computers, laptop computers, table computers, and the like), servers (such as specially configured web servers, internet media streaming services, databases, etc.), mobile devices (such as special configured mobile phones, and the like), media devices (such as specially configured media servers, televisions and other displays, speakers, theater equipment, cable boxes, tuner devices, video game consoles, DVD- and Blu-Ray players, and the like), storage devices (such as specially configured hard drives, cloud storage devices, video and audio storage devices, and the like), or any other suitable computing device specially configured to communicate with other network nodes to establish data streams and receive/transmit data as described herein. The data can include digital media content (including music data, audio/video data, gaming data, digital images, and the like), but can also include any other suitable type of data, including but not limited to text data, social networking system data, mobile phone or device data, communications data, spreadsheet data, and the like. The nodes within the network can transmit and receive data using any suitable technology, such as Serial ATA ("SATA"), Frame Information Structure ("FIS"), High-Definition Multimedia Interface ("HDMI"), Mobile High-Definition Link ("MHL"), Category-5 or Category-6 cable, co-axial cable, or any other suitable networking technology. In addition to wired connections between nodes, nodes within a network can be wireless, utilizing technologies such as Wi-Fi, Wi-Max, Bluetooth, LTE, and the like. A network can include a personal entertainment network, such as a network in a household, a network in a business setting, or any other network of devices and/or components. Examples of networks include a Local Area Network (LAN), Wide Area Network (WAN), Metropolitan Area Network (MAN), intranet, the Internet, etc.

In a network, certain nodes may be a source of data, such as a digital television tuner, cable set-top box, a mobile device (such as a smart phone), video storage server, and the like. Such nodes are referred to herein as "source nodes". Other nodes may receive, display, use, or store media content, such as a digital television, home theater system, audio system, gaming system, video and audio storage server, and the like. Such nodes are referred to herein as "sink nodes". As used herein, "data stream" refers to the transmission of data by a source node and the subsequent receipt of data by a corresponding sink node, through zero, one, or more intermediary nodes within a data path. As used herein, "data path" refers to an ordered set of nodes and associated node connections through which data corresponding to a data stream is transmitted and/or received. In some embodiments, a data path includes a source node and a sink node. In other embodiments, a data path includes a source node, a sink node, and one or more intermediary nodes. For example, a data path can include the ordered set {source node, node A, node B, sink node}, through which data is transmitted by the source node, received and re-transmitted at node A, received and re-transmitted by node B, and received at the sink node.

As used herein, a "network with an unknown topology" refers to a network of nodes such that at least one node does not know or have immediate access to the number of nodes in the network, the connections between the nodes in the network, the capabilities or limitations of one or more nodes in a network, or any combination thereof. For example, certain nodes may operate under bandwidth or latency limitations, may not be able to support certain data formats or stream formats, may not be able to support certain media limitations (such as resolution or media format limitations), and the like. Accordingly, source nodes in networks with unknown topologies are often unable to select an optimal data path based on data stream priorities. For example, in a network with many potential data paths from a source node to a sink node, a first data path may be associated with the greatest bandwidth, a second data path may be associated with the lowest latency, and a third data path may be associated with the shortest distance (number of intermediary nodes, or "hops"). Without knowing such a network's topology, a source node may be unable to identify the optimal data path in view of potential data stream priorities, such as maximizing bandwidth, minimizing latency, and minimizing distance. Further, when a network topology changes (for instance, when a new node is added to a network or an existing node is removed from the network), the potential data paths in the network can change, and the optimal data paths in view of data stream priorities within the network may change. Without further analysis of the changed network topology, a source node may be unable to identify an optimal data path within the network.

FIG. 1 is a block diagram illustrating a network topology, according to one embodiment. In the network 100 of FIG. 1, seven nodes (Nodes A through G) are communicatively coupled. Node A is communicatively coupled to Node B. Node B is additionally communicatively coupled to Nodes C, D, and F. Node C is additionally communicatively coupled to Node D. Node D is additionally communicatively coupled to Node E. Node E is additionally communicatively coupled to Node G. Node F is additionally communicatively coupled to Node G. It should be noted that for purposes of the description herein, the network topology illustrated in FIG. 1 is unknown to one or more nodes within the network 100. Further, each node in FIG. 1 can be the same type or configuration of computing device, or can be a different type or configuration of computing device than one or more other nodes. Finally, the type of each node connection within the network 100 can be the same, or can be different from one or more other node connections.

Routine Table Creation

Figure 2:
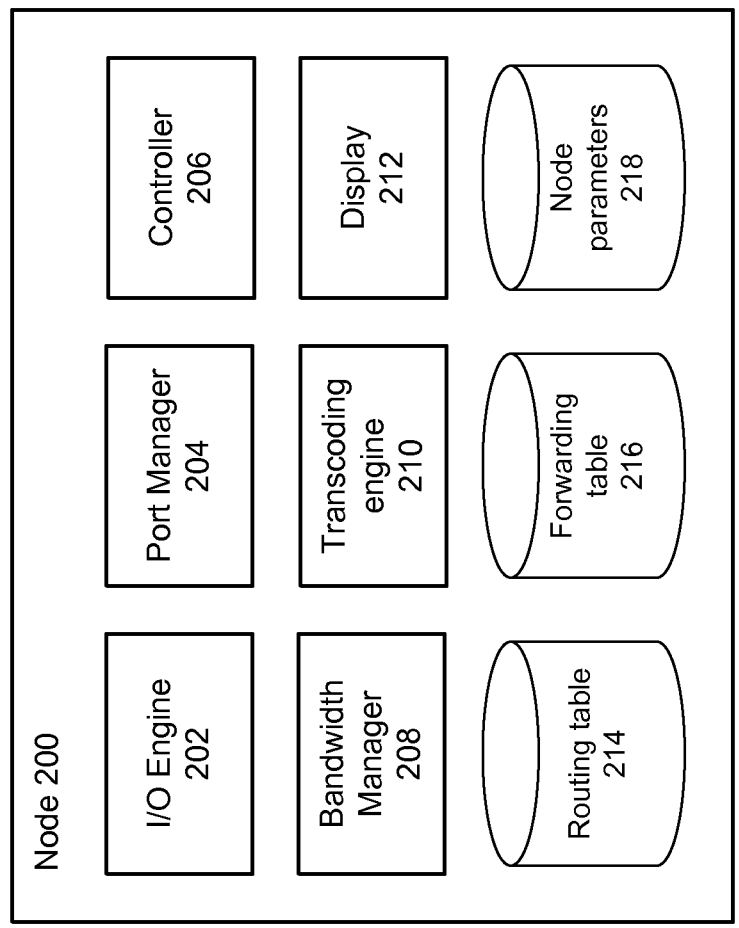
FIG. 2 is a block diagram illustrating a network node, according to one embodiment.

FIG. 2 is a block diagram illustrating a network node, according to one embodiment. In the embodiment of FIG. 2, the node 200 includes an input/output ("I/O") engine 202, a port manager 204, a controller 206, a bandwidth manager 208, a transcoding engine 210, a display 212, a routing table 214, a forwarding table 216, and a node parameters storage 218. It should be noted that in other embodiments, a node 200 can include different or additional components than those illustrated herein (such as a data store configured to store received data or speakers configured for playback of audio data).

The I/O engine 202 is configured to receive data from and to provide data to other nodes. In other words, the I/O engine 202 provides a communicative interface between the node 200 and the remainder of the network. The node 200 includes one or more communicative ports, each of which can be communicatively coupled to other nodes. The port manager 204 can identify which ports are communicatively coupled to other nodes. For example, if a node has five communicative ports, two of which are coupled to different nodes, the port manager 204 can identify the two nodes, and in some embodiments can identify the node to which the ports are coupled. The bandwidth manager 208 can reserve bandwidth requested or required for particular data streams, and can subsequently release extra reserved bandwidth not needed for a particular data stream. The transcoding engine 210 is configured to transcode data in a first format into data of a second format, as described in greater detail below. The display 212 is configured to display data received by the node 200, for instance media data.

The controller 206 can discover the topology of a network, can generate or update a routing table 214, can establish a data stream within the network (or can assist a source node in the establishment of a data stream), can generate or update a forwarding table 216, and can optimize an established data stream within the network by releasing unnecessary reserved bandwidth. In a discovery configuration, the controller 206 sends a discovery message to each node connected to the node 208. To send a discovery message, the controller 206 queries the port manager 204 to identify node ports communicatively coupled to other nodes, and outputs the discovery message on the identified node ports via the I/O engine 202. As used herein, "discovery configuration" or "discovery mode" refers to the propagation of discovery messages throughout a network in order to identify, characterize, or map one or more aspects of the network topology.

The discovery messages sent by the controller 206 identify the node 200 and can identify the available bandwidth between the node 200 and each recipient node. Further, the controller 206 can timestamp the discovery message with the current time such that the recipient node can determine the latency between the node 200 and the recipient node (for instance, by comparing the timestamp to the time the discovery message was received). It should be noted that in some embodiments, latency can be measured in other ways, for instance by measuring the amount of time between when a node receives a message or other data and then forwards or acts upon the received data.

In the discovery mode, the controller 206, in response to receiving a discovery message from a transmitting node (for instance, via the I/O engine 202), is configured to re-transmit the discovery message to each additional node to which the node 200 is connected, for instance by querying the port manager 204 to identify ports communicatively coupled to nodes other than the port through which the discovery message was received. Before re-transmitting the discovery message to additional nodes, the controller 206 can determine the available bandwidth between the node 200 and each additional node. If, for a particular additional node, the bandwidth between the node 200 and the additional node is determined to be less than the bandwidth identified in the discovery message, the controller 206 can update the discovery message before transmitting the message to the additional node to identify the determined bandwidth between the node 200 and the additional node. Accordingly, each node in a data path can identify the lowest bandwidth between two adjacent nodes within the data path based on the identified available bandwidth within the discovery message (referred to herein as "bandwidth information"). It should be noted that in some embodiments, bandwidth is measured bi-directionally, by determining the total bandwidth available for communication in each direction between two adjacent nodes.

The controller 206, in response to receiving a discovery message from a transmitting node, can determine the latency between the transmitting node and the node 200. The controller 206, in response to determining the latency, can update the discovery message before re-transmitting the discover message to include the determined latency. In embodiments in which the transmitting node is the originating node (the node that first transmitted the discovery message), the controller 206 can include the determined latency within the discovery message. In embodiments in which the transmitting node is re-transmitting the discovery message from a different node, the discovery message can include a latency measure—in such embodiments, the controller 206 can add the determined latency to the latency identified within the discovery message to reflect a total latency between the originating node and the node 200. Accordingly, for each node in a data path, the node can determine the total latency from the originating node through any intermediary nodes within the data path to the node itself based on the latency identified within the discovery message and the determined latency between the node and the transmitting node from which the discovery message was received (referred to herein as "latency information").

In some embodiments, the controller 206 updates the discovery message to reflect the receipt of the discovery message by the node 200, for instance by incrementing a hops or distance count stored within the discovery message. For example, after the first re-transmission of a discovery message, the hops or distance count stored within the discovery message can be updated to "2", after the second re-transmission, the hops or distance count can be updated to "3", and so forth. Thus, for each node in a data path, the node can determine the total distance from the originating node to the node, based on the hops or distance count stored within the discovery message (referred to herein as "distance information").

The controller 206 is further configured to update a routing table 214 in response to and based on received discovery messages. The controller 206 can parse the identity of the originating node from the discovery message, and can map the identity of the originating node to the port of the node 200 through which the discovery message was received. Further, the controller 206 can parse from the discovery message: a hops or distance count from the discovery message, a minimum bandwidth within the discovery message data path, a total latency between the originating node and the node 200, or any combination thereof. Such parsed information can be stored within the routing table 214 in conjunction with the identity of the originating node and the port mapped thereto.

If a discovery message is received from a particular originating node on a particular port, and if the routing table 214 does not include an entry for the particular originating node and port, the controller 206 can create an entry mapping the originating node to the port and including addition information, such as a distance from the originating node to the node 200, the total latency from the originating node to the node 200, and the minimum bandwidth between adjacent nodes within the data path from the originating node to the node 200 via the particular port.

If a discovery message is received from a particular originating node on a particular port, and if the routing table 214 does include an entry for the particular originating node and port, the controller 206 can determine whether to replace the entry with information parsed from the received discovery message or maintain the entry based on a comparison of the information within the entry and corresponding information parsed from the received discovery message. In some embodiments, the controller 206 replaces the routing table entry with information parsed from the received discovery message in response to a determination that the information parsed from the received discovery message is preferred or superior to the information stored in the existing routing table entry. For example, if the minimum bandwidth between adjacent data path nodes identified in the received discovery message is greater than the minimum bandwidth information stored in the corresponding routing table entry, the controller 206 can replace the routing table entry with information parsed from the discovery message. Likewise, if the total latency identified in the received discovery message is less than the latency information stored in the corresponding routing table entry, the controller 206 can replace the routing table entry with information parsed from the discovery message. In yet another example, if the distance identified in the received discovery message is less than the distance information stored in the corresponding routing table entry, the controller 206 can replace the routing table entry with information parsed from the discovery message. In some embodiments, the controller 206 decides to replace the routing table entry with information parsed from the discovery message in response to a combination of discovery message bandwidth information, latency information, and distance information being preferable to routing table entry bandwidth information, latency information, and distance information.

In some embodiments, each node in a network of nodes outputs discovery messages corresponding to the node, and propagates/re-transmits discovery messages received from other nodes. In such instances, each node in a network receives discovery messages originating from each other node in the network on each port of the node, and discovery messages traverse each data path from an originating node to each node in the network. Accordingly, each node in the network is able to identify an adjacent node within a data path from each port of the node to each originating node associated with optimal bandwidth information, latency information, and distance information. In some embodiments, discovery messages are propagated through the network of nodes for a threshold amount of time, until a data path from an originating node to another node associated with threshold bandwidth, latency, or distance information is identified, for a threshold number of discovery message re-transmissions by one or more nodes, or based on any other suitable factor. After a discovery mode, each node in the network stores a corresponding routing table identifying bandwidth, latency, and distance information as described herein for each combination of node port and originating node. As described in greater detail below, the routing tables stored by each node can be used to establish data streams within the network.

The operation of nodes in a discovery mode as described herein can be initiated in response to a request from one or more nodes within the network. Further, the discovery mode can be initiated in response to the passage of a threshold amount of time. The discovery mode can also be initiated in response to the addition or removal of one or more nodes to/from the network. In such instances, the optimal data paths for one or more nodes can change in response to the addition or removal of the one or more nodes to/from the network. For example, if an optimal data path from a first node to a second node traversed a third node, and the third node was removed from the network, an updated optimal data path from the first node to a second node can be identified based on an updated set of routing tables stored by the nodes in response to the discovery mode initiated by the removal of the third node. In discovery mode embodiments initiated in response to the addition or removal of a node from a network, a node can increment a discovery mode counter included within the discovery message, allowing nodes that receive discovery messages to determine that a new discovery mode has been initiated and to disregard discovery messages that include counter values associated with previous discovery modes.

Figure 3:
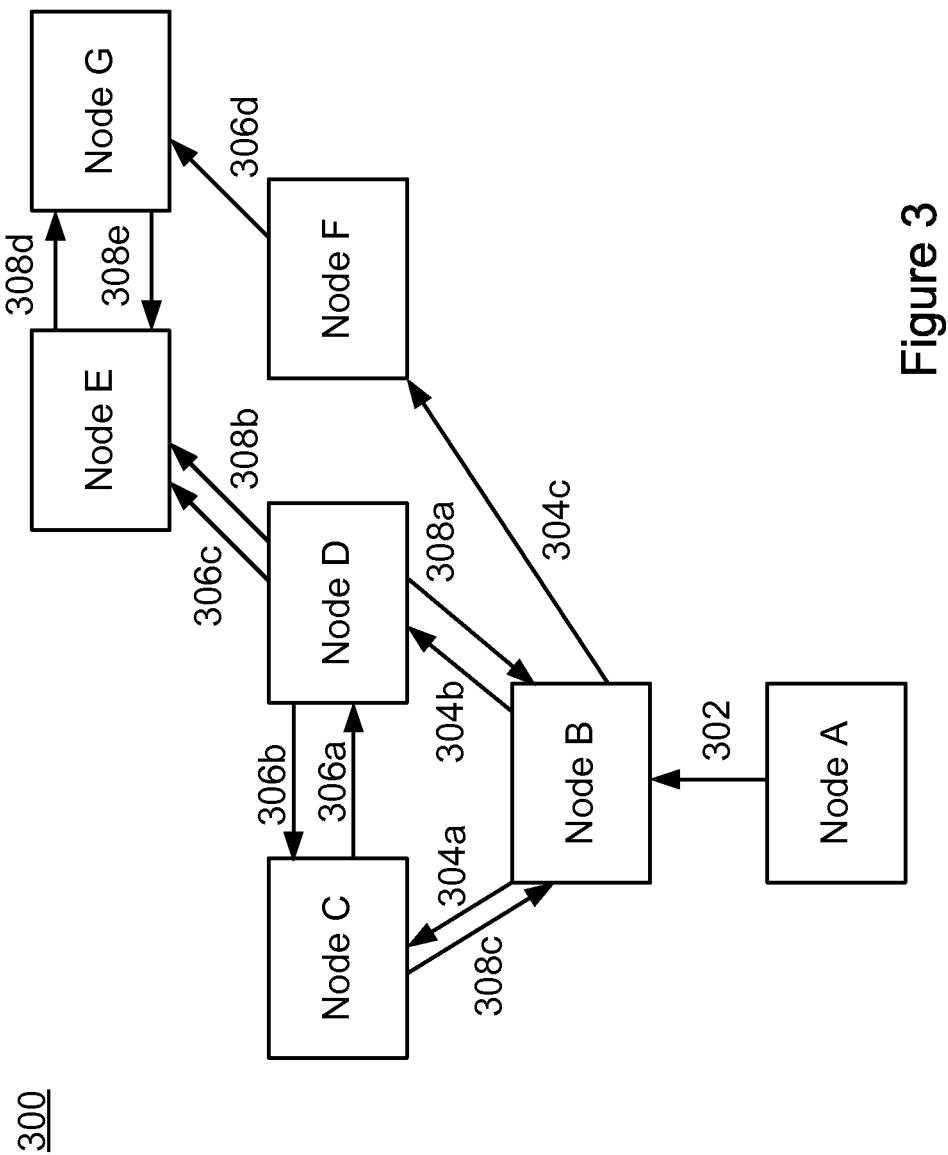
FIG. 3 is a block diagram illustrating a topology discovery process of a network, according to one embodiment.

FIG. 3 is a block diagram illustrating a topology discovery process of a network 300, according to one embodiment. In the embodiment of FIG. 3, node A generates and outputs a discovery message 302 to node B (the only node communicatively coupled to node A) in a first step. Node B parses the identity of the originating node (node A) from the discovery message and creates a routing table entry within the routing table stored at node B mapping the originating node to the port of node B through which the discovery message was received. Node B can additionally parse or determine the available bandwidth, the latency, and the distance between node A and node B based on the received discovery message 302, and can store this information in the created routing table entry.

In a second step, node B updates the discovery message as described above (for instance, to update the distance information, bandwidth information, and latency information associated with the discovery message) and re-transmits the discovery message to each node coupled to node B other than node A. In the embodiment of FIG. 3, node B transmits the updated discovery message 304a to node C, the update discovery message 304b to node D, and the update discovery message 304c to node F. Similar to node B, nodes C, D, and F create routing table entries based on the updated discovery messages 304a, 304b, and 304c, respectively.

In a third step, nodes C, D, and F update the discovery messages 304a, 304b, and 304c, respectively, and re-transmit the discovery messages to each node coupled to nodes C, D, and F other than the nodes from which the discovery message was received. In the embodiment of FIG. 3, node C transmits the discovery message 306a to node D, node D transmits the discovery message 306b to node C and the discovery message 306c to node E, and node F transmits the discovery message 306d to node G. Each of nodes C, D, E, and G create routing table entries corresponding to the received discovery messages as described above.

In a fourth step, nodes D, C, E, and G update the discovery messages 306a, 306b, 306c, and 306d, respectively, and re-transmit the discovery messages to each node coupled to nodes D, C, E, and G other than the nodes from which the discovery message was received. In the embodiment of FIG. 3, node D transmits the discovery message 308a to node B and the discovery message 308b to node E, node C transmits the discovery message 308c to node B, node E transmits the discovery message 308d to node G, and node G transmits the discover message 308e to node E. Each of nodes B, E, and G create routing table entries corresponding to the received discovery messages as described above.

In subsequent steps, the nodes in the network 300 continue to update and re-transmit discovery messages as described above. In these subsequent steps, each node creates a routing table entry corresponding to the originating node A and the port on which a discovery message is received if a routing table entry corresponding to the originating node A and port doesn't already exist. If such an entry does exist, each node updates the entry corresponding to the originating node A and port in response to a determination that a received discovery information is associated with one or more of bandwidth information, latency information, or distance information preferable to the bandwidth information, latency information, or distance information associated with the existing routing table entry. This process is continued until each node has received a discovery message originating with node A on each port associated with the node and through each possible data path between the node and the originating node A. Further, it should be noted that while the embodiment of FIG. 3 is described from the context of node A as the originating node, in practice, each node will act as an originating node, propagating discovery messages through the network 300 until each node stores a completed routing table with entries corresponding to each originating node and each node port.

FIG. 4 illustrates a routing table for use by a topology discovery process, according to one embodiment. The routing table 400 corresponds to a routing table for node G in the network 300 of FIG. 3. Node G in the network 300 includes two ports: port 1, which couples node G to node F in the network 300, and port 2, which couples node G to node E in the network 300. The routing table 400 includes an entry for each originating node within the network 300 (in other words, every node other than node G within the network) mapped to each port of node G. Each entry further includes 1) a distance from the originating node corresponding to the entry to node G via the port of node G corresponding to the entry, 2) the total latency between the origination node corresponding to the entry and node G via the port of node G corresponding to the entry, and 3) the minimum available bandwidth between adjacent nodes in the data path from the originating node corresponding to the entry and node G via the port of node G corresponding to the entry.

For instance, because node G has two ports, the routing table 400 has two entries, one for each port, corresponding to each originating node. For example, the routing table entry for node C and port 2 of node G identifies 3 hops between node C and node G via port 2, identifies a total latency of 26 ms between node C and node G via port 2, and identifies a minimum available bandwidth of 4.1 mb/s between nodes within the data path from node C to node G via port 2. The minimum 4.1 mb/s bandwidth can represent a bandwidth between node C and node D, between node D and node E, or between node E and node G (the entirety of the data path from node C to node G via port 2 of node G). It should be noted that in other embodiments, routing tables can include different or additional information, such as an identity or type of nodes within a particular data path, an available bandwidth between each pair of adjacent nodes in a data path, a latency through each node in a data path, or any other suitable information. It should be noted that although bandwidths described herein are between 2.0 mb/s and 10.0 mb/s, in practice, any possible bandwidth, including bandwidths less than 2.0 mb/s and greater than 10.0 mb/s (such as 1.0 gb/s and greater) can be utilized within a network and tracked within forwarding tables.

Figure 5:
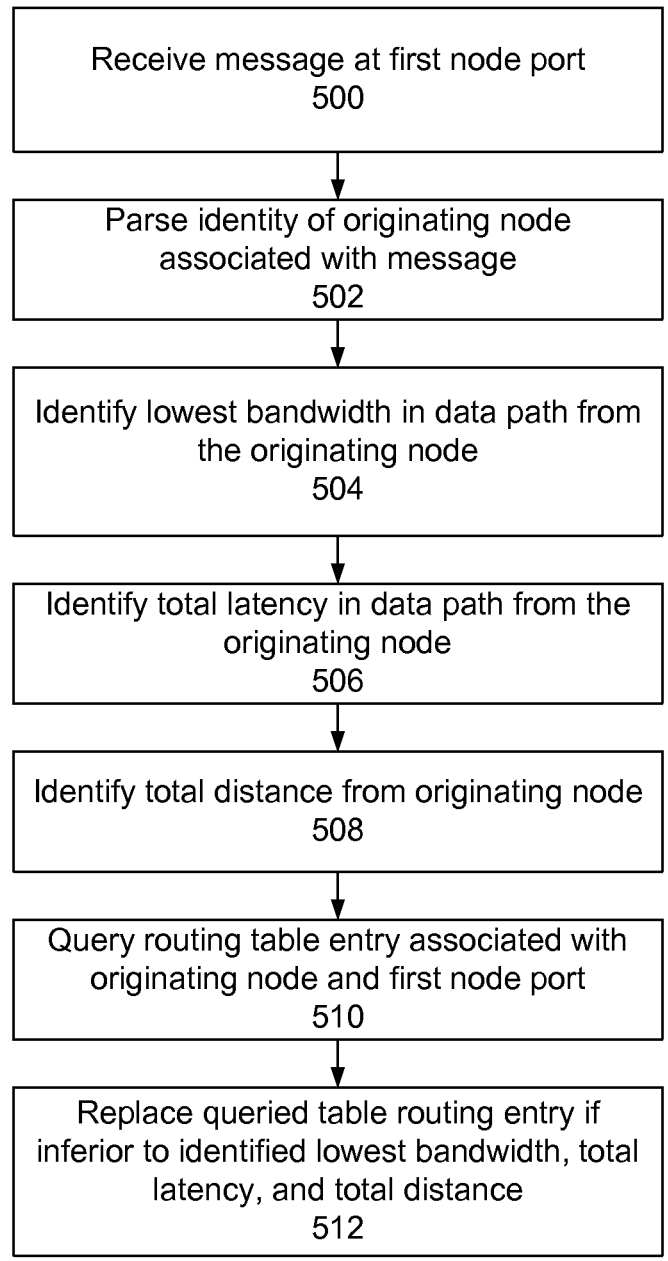
FIG. 5 is a flow chart illustrating a process of topology discovery, according to one embodiment.

FIG. 5 is a flow chart illustrating a process of topology discovery, according to one embodiment. A node receives 500 a discovery message via a first node port from a transmitting node. In some embodiments, the transmitting node is an originating node of the discovery message, while in other embodiments, the transmitting node is a node within the data path from an originating node to the node configured to re-transmit the discovery message.

The identity of the originating node associated with the discovery message is parsed 502 from the discovery message. The lowest bandwidth between nodes in the data path from the node receiving the discovery message to the originating node is identified 504 based on the discovery message. The total latency between the node and the originating node is identified 506 based on the discovery message. The total distance between the node and the originating node is also identified 508 based on the discovery message.

An entry associated with the originating node and the first node port in a routing table corresponding to the node is queried 510. In some embodiments, the routing table does not include an entry associated with the originating node and the first node port—in such embodiments, an entry is created based on the identity of the originating node, the first node port, the identified lower bandwidth, the identified total latency, and the identified total distance. In the event that the routing table includes an entry corresponding to the originating node and the first node port, the entry can be replaced 512 with the identified lowest bandwidth, the identified latency, and the identified total distance if the corresponding information included within the routing table entry is determined to be inferior to the identified bandwidth, latency, and distance. For instance, the entry can be replaced if the stored total latency is greater in magnitude than the identified total latency.

Data Path Selection, Establishing Data Streams, and Forwarding Table Creation

Figure 6:
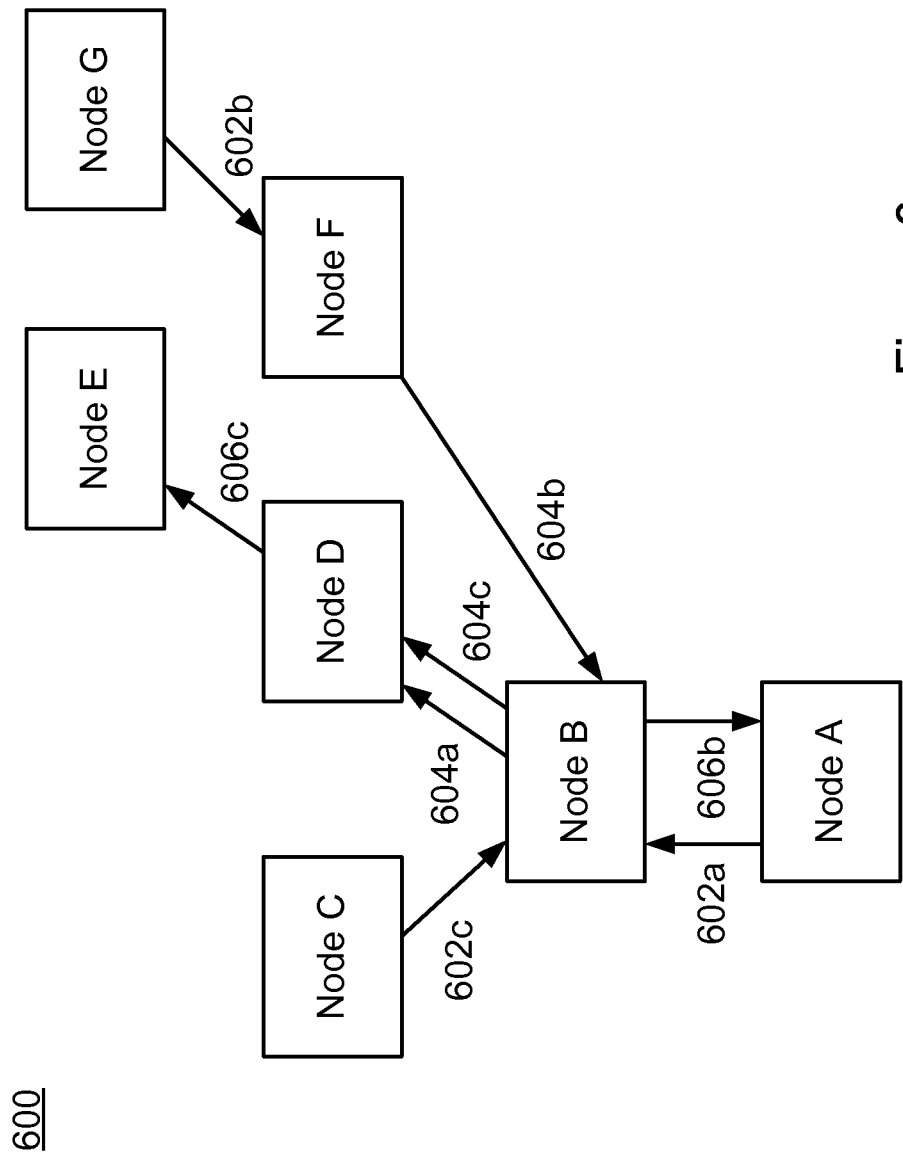
FIG. 6 is a block diagram illustrating a plurality of data paths within a network, according to one embodiment.

FIG. 6 is a block diagram illustrating a plurality of data paths within a network 600, according to one embodiment. In the network 600, a first data path from a source node A to a sink node D is defined by communicative link 602a from node A to node B and communicative link 604a from node B to node D. A second data path from a source node G to a sink node A is defined by communicative link 602b from node G to node F, communicative link 604b from node F to node B, and communicative link 606b from node B to node A. A third path from a source node C to a sink node E is defined by communicative link 602c from node C to node B, communicative link 604c from node B to node D, and communicative link 606c from node D to node E. It should be noted that, as illustrated in FIG. 6, nodes can accommodate different data streams over common communicative links, as will be discussed below in greater detail.

A data path from a source node to a sink node can be selected, for instance to establish a data stream between the sink node and the source node, using the routing tables associated with each node in a network (such as the network 600) by identifying, for each node, an output port corresponding to the sink node (or the "originating node" of FIG. 4). The data path is selected one node at a time by querying the routing table associated with a first node (such as the source node) to select an output node port corresponding to a second node in the data path, querying a routing table associated with the second node to select an output node port corresponding to a third node in the data path, and so on until a routing table associated with the $n^{th}$ n node is queried and an output node port corresponding to the sink node is selected. In other words, the data path is selected one node at a time, starting with the source node, selecting a next node in the data path by selecting an output node port, and continuing until the sink node is reached. During the selection of a data path, upon reaching the sink node in the data path, the sink node can send a confirmation message to the source.

In selecting a data path through a network, the output node port for each node in a data path can be selected using the routing table associated with each node based on 1) the identity of the sink node, and 2) based on any additional suitable criteria. In some embodiments, an output node port can be selected based on a type of data stream, based on an identity or type of a source node in the data path, based on an identity or type of a sink node in a data path, based on a type of data being transmitted, or based on any other suitable criteria. For example, for video data, the routing table associated with each node in the data path can be queried to identify the output node port corresponding to the desired sink node and associated with the highest minimum bandwidth. Similarly, for video game console source nodes, the routing table associated with each node in the data path can be queried to identify the output node port corresponding to the desired sink node and associated with the lowest total latency. In some embodiments, an output node port can be selected based on one or more data stream criteria or priorities. For instance, if a data stream priority is the selection of a data path corresponding to the greatest minimum bandwidth, the smallest latency, or the shortest distance between the source node and the sink node, routing tables associated with each node can be queried to select an output node port accordingly.

Data paths can be selected within networks in order to establish a data stream over the data path. Accordingly, a data path can be selected in response to a request to establish a data stream. Data streams can be identified within a network 600 by a global stream identifier (or "global ID"). Global IDs are globally unique, allowing each node within a network to uniquely identify a data stream using the global ID. Global IDs are semi-permanent fixtures, enabling nodes to track and remember stream IDs over events such as power losses and re-routings of data paths due to, for example, node shutdowns. Further, each node within a network can be included in more than one data path, and can output data corresponding to more than one data stream on a single output node port. In addition to global IDs, different data streams outputted on a single output node port can be identified or differentiated between by a local stream identifier (or "local ID"). Local IDs enable are unique to a particular node, enabling a node to differentiate between data streams within the node. Accordingly, local IDs can be small in size, enabling a node to efficiently filter between and forward data streams. Each data stream can be associated with a required bandwidth, and each node in a data stream's data path can reserve the required bandwidth (or an estimate of the required bandwidth if the required bandwidth is unknown) between the node and a next node in the data path, for instance using a bandwidth manager (such as the bandwidth manager 208). The bandwidth manager 208 can reserve the output bandwidth required by a data stream on an output node port, preventing other data streams from using the bandwidth. It should be noted that although the selection of a data path and the establishment of a data path are described separately herein, in some embodiments, a data path can be selected concurrently or overlapping in time with the establishment of a data stream.

To establish a data stream over the selected data path, each node in the data path receives a data stream creation request and forwards the request to the next node in the data path, and in response to the request, each node updates a corresponding forwarding table (such as the forwarding table 216) stored at each node to identify the data path and data stream. To update a forwarding table in response to establishing a data stream, a forwarding table entry corresponding to the data stream is generated. The generated forwarding table entry can include a global ID for the data stream, one or more local IDs for the data stream (for instance a first local ID for an input port and a second local ID for an output port), an input port corresponding to the data path, an output port corresponding to the data path, an input port bandwidth, and an output port bandwidth reserved for the data stream. The global ID and the required bandwidth for the data stream can be identified within the data stream request. The local ID can be generated by each node to enable the node to differentiate between multiple data streams corresponding to the same output node. The input port can be determined based on the port upon which the data stream creation request is received. The output port can be identified by data stream creation request, by reference to the data path, or by querying the routing table with the input port and the source node, and using the output node selection criteria used to select the data path.

Accordingly, a forwarding table entry corresponding to a data stream is created in a forwarding table for each node in the data path from the source node to the sink node. When a forwarding table entry corresponding to the sink node is created, the sink node can output a completion signal indicating that the data stream has been established, which is forwarded to the source node, indicating that the source node can begin outputting data to the sink node within the established data stream. Data corresponding to a data stream received at a node within the data path is forwarded by the node to a next node in the data path by querying the forwarding table to identify an output node for the data stream, and by outputting the received data via the identified output node.

FIG. 7 illustrates a forwarding table for use by a node in establishing a data stream within a network, according to one embodiment. The forwarding table 700 illustrated in FIG. 7 is a forwarding table generated and stored by node B in the network 600 of FIG. 6. The forwarding table 700 includes entries representative of a data stream for each selected data path within the network 600. A first data stream represented by global ID "A" is established over the data path from node A to node B via port 1 (the input port), and from node B to node D via port 3 (the output port). Node B assigns data stream A the local ID "X", and reserves 4.4 mb/s of output bandwidth on port 3 for data stream A. Accordingly, the forwarding table entry corresponding to data stream A includes the local ID X, the input port 1, the output port 3, and the reserved 4.4 mb/s bandwidth. Similarly, forwarding table entries corresponding to a second stream represented by global ID "B" and a third stream represented by global ID "C" are created. It should be noted that although only output bandwidth is illustrated in the forwarding table of FIG. 7, in practice forwarding tables can also include input bandwidth, which is initially set to the maximum bandwidth possible on the input port, and then is adjusted in response to the releasing of unnecessary reserved bandwidth in response to establishing a data stream.

Figure 8:
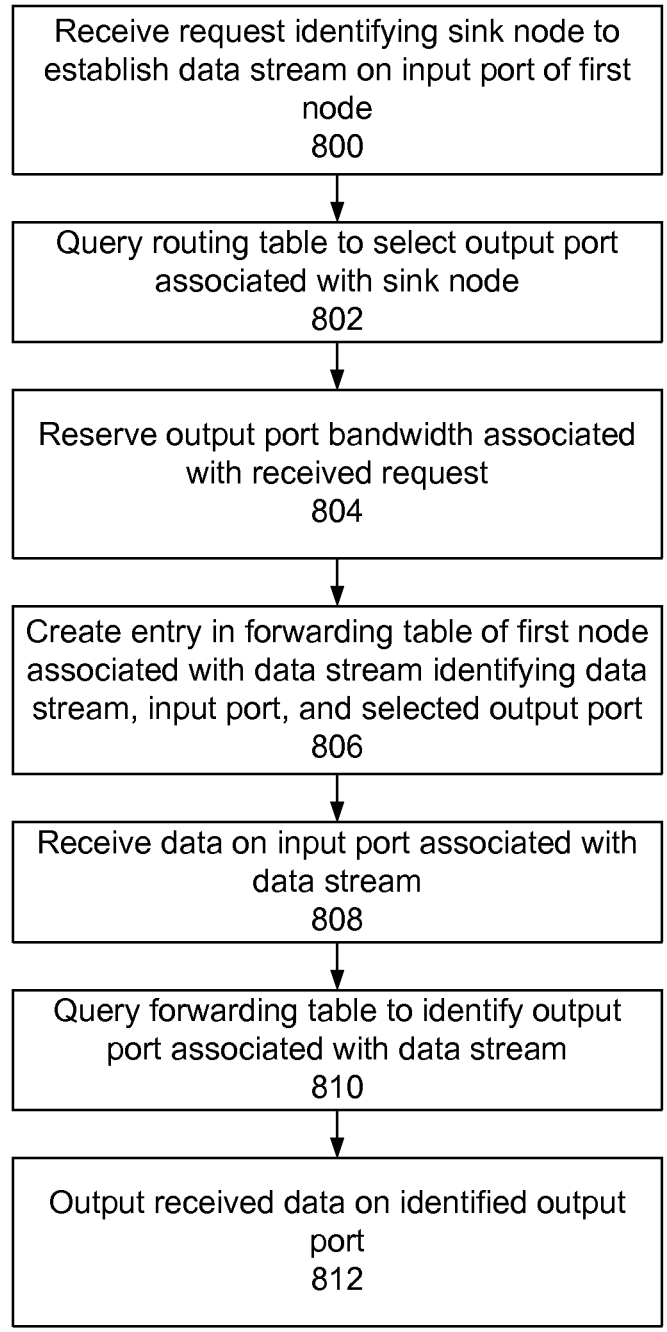
FIG. 8 is a flow chart illustrating a process for selecting a data path and establishing a data stream within a network, according to one embodiment.

FIG. 8 is a flow chart illustrating a process for selecting a data path and establishing a data stream within a network, according to one embodiment. In the embodiment of FIG. 8, a request to establish a data stream is received 800 on an input port of a first node. The request identifies a sink node, and can identify a required bandwidth for the data stream. A routing table corresponding to the first node is queried to select an output port associated with the sink node. In some embodiments, an output port is selected based one or more of bandwidth information, latency information, and distance information corresponding to the sink node in the routing table.

Output port bandwidth corresponding to the identified output port is reserved 804, for instance based on the format of the requested data stream. A forwarding table entry is created 806 within a forwarding table of the first node identifying the data stream, the first input port, and the selected output port. In some embodiments, the forwarding table entry further includes a local stream identifier and the reserved bandwidth associated with the selected output port.

Subsequent to the creation of a forwarding table entry corresponding to the data stream, data associated with the data stream is received 808 on the input port. In response, the forwarding table is queried 810 to identify the output port associated with the data stream. In some embodiments, the forwarding table is queried based on a data stream identifier or a local stream identifier. The received data is then outputted 812 on the identified output port. It should be noted that in some embodiments, a data path is first selected, a list of available formats is propagated from the sink node to the source node, a format is chosen by the source node, and only then is the bandwidth reserved based on the chosen format.

Figure 9:
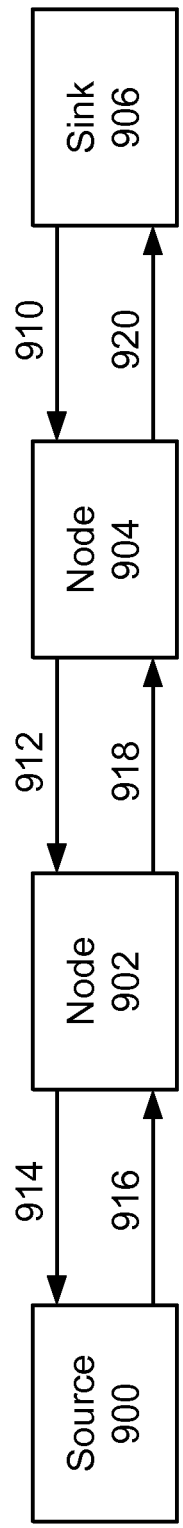
FIG. 9 is a block diagram illustrating the establishment of a data stream within a network, according to one embodiment.

FIG. 9 is a block diagram illustrating the establishment of a data stream within a network, according to one embodiment. It networks with unknown topologies, data streams can be established incrementally to account for the unknown capabilities of each node in a data path. In the embodiment of FIG. 9, a data path is selected between a source node 900 and a sink node 906. The selected data path includes nodes 902 and 904. To establish a data stream, the source node 900 can send a data stream request (not illustrated) to the sink node 906 through the nodes 902 and 904. The data stream request can identify a type of data stream (such as a type or format of data being transmitted via the data stream), a required or approximate data stream bandwidth, and/or any other suitable information associated with the data stream. Each node in the selected data path reserves the amount of output bandwidth required or requested by the data stream request, for instance in response to receiving the data stream request, in response to receiving a confirmation or acceptance of the requested by the sink node 906, or in response to any other suitable event.

In response to receiving a request to establish a data stream, the sink node 906 compiles a list of data formats with which the sink node 906 is compatible (e.g., a data format that a node is capable of receiving, processing, outputting, storing, and/or displaying). In some embodiments, the list of data formats is curated based on the request to establish a data stream (for instance, if the request to establish a data stream identifies a video format, the sink node 906 can filter the provided list of data formats to video formats). The sink node 906 provides the list of available formats 910 to the node 904. The node 904 curates the list 910 to remove formats that the node 904 is incompatible with, producing a first updated list 912. In some embodiments, the node 904 can additionally add formats to the first updated list 912, such as formats that the node 904 is capable of transcoding into one or more formats within the list 910 (using, for example, the transcoding engine 210 of the node 200). For example, if the list 910 includes the .AVI video format but not the .MP4 video format, and the node 904 is capable of transcoding .MP4 video to .AVI video, the node 904 can add the .MP4 format to the list 912. When the data stream is subsequently established and the node 904 receives .MP4 format video data, the node 904 can then transcode the .MP4 video data into .AVI video data, and can output the transcoded .AVI format video data to the sink node 906.

The node 902, in response to receiving the updated list of formats 912 from the node 904, in turn produces a list of formats 914 by removing formats that the node 902 is incompatible with and adding formats that the node 902 is capable of transcoding into one or more formats within the list 912. The list 914 is received by the source node 900. The source node 900 selects a format from the list 914, for instance based on a pre-determined data format ranking or preference of the source node 900 or the sink node 906, based on an amount of bandwidth required by each format within the list 914, based on an amount of transcoding required within the data stream, or based on any other suitable factor. The source node 900 can optimize the data stream by determining the amount of bandwidth required to establish the data stream based on the selected format, and releasing any previously reserved bandwidth not needed to output data in the selected format (using, for instance, the bandwidth manager 208 of the node 200). For instance, if the source node 900 has previously reserved 10 mb/s for the data stream (for instance, in response to output a request to establish a data stream, in response to receiving a confirmation of receiving the request from the sink node 906, in response to the selection of a data path, or in response to any other suitable factor), but the data format selected by the source node 900 only requires 7 mb/s to output, then the source node 900 can free 3 mb/s of the reserved 10 mb/s, allowing the source node 900 to allocate the 3 mb/s bandwidth to other data streams. It should be noted that as used herein, "reserved bandwidth" can refer to either bandwidth reserved for a particular node output, or bandwidth reserved across all node outputs (total node output bandwidth).

The source node 900 provides the selected format 916 to the node 902. The node 902, in response to receiving the selected format 916, determines if the node 902 is compatible with the selected format 916. In the event that the node 902 is compatible with the selected format 916, the node 902 outputs the selected format 918 to the node 904. In the event that the node 902 is not compatible with the selected format, the node 902 selects a different format that 1) the node 902 can processing and/or output, and 2) into which the node 902 is capable of transcoding received data in the received format 916. The node 902 then outputs the selected format 918 to the node 904 (which will be a format from the list of formats 912). Similar to the source node 900, the node 902 releases any unnecessary previously reserved bandwidth for allocation to other data streams based on the selected format 918. Node 904 similarly receives the selected format 918, and outputs it as the selected format 920, or selects a different format into which the node 904 can transcode the format 918, and outputs the selected different format 920. The node 904 can also releases any unnecessary previously reserved bandwidth for allocation to other data streams based on the selected format 920.

The sink device 906 receives the selected format 920 (which will be a format from the list of formats 910), and provides a confirmation to the source node 900 (via the nodes 902 and 904) to proceed with providing data from the data stream. The source node 900, in response to receiving the confirmation from the sink node 906, outputs data in the data format 916. The node 902 receives the data, and outputs the data if the format 916 and the format 918 are the same format, or transcodes the data into the format 918 if the formats are different. The node 904 receives the data from the node 902, and outputs the data if the format 918 and the format 920 are the same, or transcodes the data into the format 920 if the formats are different. The sink node 906 receives the data from the node 904, and (for example) displays the received data via the display 212, stores the data, forwards the data to an additional node not shown in the embodiment of FIG. 9, or processes the data if necessary.

Figure 10:
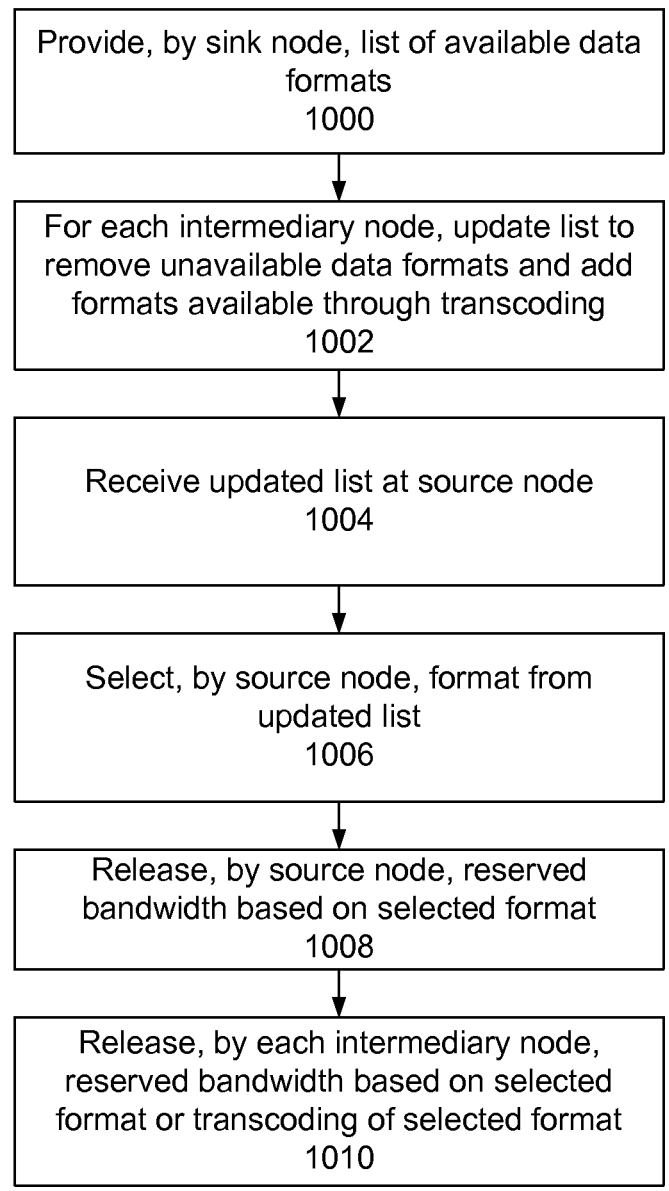
FIG. 10 is a flow chart illustrating a process for establishing a data stream within a selected data path, according to one embodiment.

FIG. 10 is a flow chart illustrating a process for establishing a data stream within a selected data path, from a source node to a sink node, according to one embodiment. A sink node provides 1000 a list of available data formats (data formats which the sink node can receive and/or process) to an intermediary node within the selected data path. Each intermediary node receives the list from a downstream node (the sink node or a node between the intermediary node and the sink node) updates 1002 the list of formats to remove unavailable data formats (formats that an intermediary node is unable to receive and/or process), and to add formats from which an intermediary node can transcode into one or more formats from the provided list. The updated list is received 1004 at the source node in the selected data path. The source node selects 1006 a format from the updated list of available formats. The source node released 1008 reserved bandwidth based on the selected format (for instance, reserved bandwidth not necessary for outputting data in the selected format). Each intermediary node receives the selected data format or a format to which data in the selected format is transcoded from an upstream node (the source node or a node between the intermediary node and the source node) and similarly releases 1010 reserved bandwidth based on the selected data format or a format to which data in the selected format is transcoded. The sink node can subsequently provide a confirmation to the source node to begin transmitting data, and the source node, in response can output data in the selected data format.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. One of ordinary skill in the art will understand that the hardware, implementing the described modules, includes at least one processor and a memory, the memory comprising instructions to execute the described functionality of the modules.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting.

What is claimed is:

1. A method comprising:
   receiving, at a first node via an input port of the first node, a request to establish a data stream between a source node and a sink node;
   querying a routing table with an identity of the sink node to select an output port of the first node, the routing table mapping each output port of the first node to potential sink nodes;
   creating an entry in a forwarding table of the first node, the entry mapping the input port and the selected output port to a global identity of the data stream, the global identity of the data stream uniquely identifying the data stream within a network from a plurality of data streams;
   receiving, at the first node via the input port, data associated with the data stream;
   querying the forwarding table with the global identity of the data stream to identify the selected output port mapped to the global identity of the data stream; and
   outputting, by the first node via the selected output port, the received data associated with the data stream.

2. The method of claim 1, wherein the request identifies a required bandwidth, and wherein the first node reserves an amount of output bandwidth on the selecting output port based on the required bandwidth.

3. The method of claim 2, wherein the forwarding table entry additionally maps a representation of the reserved bandwidth to the identity of the data stream.

4. The method of claim 1, wherein the request includes the global identity of the data stream.

5. The method of claim 1, wherein the received data includes the global identity of the data stream.

6. The method of claim 1, further comprising:
   generating, by the first node, a local identity of the data stream;

wherein the forwarding table entry additionally maps the local identity of the data stream to the global identity of the data stream.

7. The method of claim 1, comprising:
receiving, at the first node via an input port of the first node, a second request to establish a second data stream between a second source node and a second sink node;
querying the routing table with an identity of the second sink node to select a second output port of the first node;
creating a second entry in the forwarding table of the first node, the second entry mapping the input port and the selected second output port to a second global identity of the second data stream;
receiving, at the first node via the input port, second data associated with the second data stream;
querying the forwarding table with the second global identity of the second data stream to identify the selected second output port mapped to the second global identity of the second data stream; and
outputting, by the first node via the selected second output port, the received second data associated with the second data stream.

8. A system comprising:
a first node communicatively coupled to one or more other nodes, the first node comprising a processor specially configured to enable communication by the first node with the one or more other nodes and to enable the first node to perform steps comprising:
receiving, via an input port of the first node, a request to establish a data stream between a source node and a sink node;
querying a routing table with an identity of the sink node to select an output port of the first node, the routing table mapping each output port of the first node to potential sink nodes;
creating an entry in a forwarding table of the first node, the entry mapping the input port and the selected output port to a global identity of the data stream, the global identity of the data stream uniquely identifying the data stream within a network from a plurality of data streams;
receiving, via the input port, data associated with the data stream;
querying the forwarding table with the global identity of the data stream to identify the selected output port mapped to the global identity of the data stream; and
outputting, via the selected output port, the received data associated with the data stream.

9. The system of claim 8, wherein the request identifies a required bandwidth, and wherein the first node reserves an amount of output bandwidth on the selecting output port based on the required bandwidth.

10. The system of claim 9, wherein the forwarding table entry additionally maps a representation of the reserved bandwidth to the identity of the data stream.

11. The system of claim 8, wherein the request includes the global identity of the data stream.

12. The system of claim 8, wherein the received data includes the global identity of the data stream.

13. The system of claim 8, wherein the processor further enables the first node to perform steps comprising:
generating a local identity of the data stream;
wherein the forwarding table entry additionally maps the local identity of the data stream to the global identity of the data stream.

14. The system of claim 8, wherein the processor further enables the first node to perform steps comprising:
receiving, via an input port of the first node, a second request to establish a second data stream between a second source node and a second sink node;
querying the routing table with an identity of the second sink node to select a second output port of the first node;
creating a second entry in the forwarding table of the first node, the second entry mapping the input port and the selected second output port to a second global identity of the second data stream;
receiving, via the input port, second data associated with the second data stream;
querying the forwarding table with the second global identity of the second data stream to identify the selected second output port mapped to the second global identity of the second data stream; and
outputting, via the selected second output port, the received second data associated with the second data stream.

15. A non-transitory computer-readable storage medium storing computer instructions configured to, when executed by a processor of a first node communicatively coupled to other nodes, cause the first node to perform steps comprising:
receiving, via an input port of the first node, a request to establish a data stream between a source node and a sink node;
querying a routing table with an identity of the sink node to select an output port of the first node, the routing table mapping each output port of the first node to potential sink nodes;
creating an entry in a forwarding table of the first node, the entry mapping the input port and the selected output port to a global identity of the data stream, the global identity of the data stream uniquely identifying the data stream within a network from a plurality of data streams;
receiving, via the input port, data associated with the data stream;
querying the forwarding table with the global identity of the data stream to identify the selected output port mapped to the global identity of the data stream; and
outputting, via the selected output port, the received data associated with the data stream.

16. The computer-readable storage medium of claim 15, wherein the request identifies a required bandwidth, and wherein the first node reserves an amount of output bandwidth on the selecting output port based on the required bandwidth.

17. The computer-readable storage medium of claim 16, wherein the forwarding table entry additionally maps a representation of the reserved bandwidth to the identity of the data stream.

18. The computer-readable storage medium of claim 15, wherein the request includes the global identity of the data stream.

19. The computer-readable storage medium of claim 15, wherein the received data includes the global identity of the data stream.

20. The computer-readable storage medium of claim 15, the instructions configured to cause the first node to perform further steps comprising:
generating a local identity of the data stream;

wherein the forwarding table entry additionally maps the local identity of the data stream to the global identity of the data stream.

21. The computer-readable storage medium of claim 15, the instructions configured to cause the first node to perform further steps comprising:
- receiving, via an input port of the first node, a second request to establish a second data stream between a second source node and a second sink node;
- querying the routing table with an identity of the second sink node to select a second output port of the first node;
- creating a second entry in the forwarding table of the first node, the second entry mapping the input port and the selected second output port to a second global identity of the second data stream;
- receiving, via the input port, second data associated with the second data stream;
- querying the forwarding table with the second global identity of the second data stream to identify the selected second output port mapped to the second global identity of the second data stream; and
- outputting, via the selected second output port, the received second data associated with the second data stream.

* * * * *